US005617098A

United States Patent [19]
Koyanagi et al.

[11] Patent Number: 5,617,098
[45] Date of Patent: Apr. 1, 1997

[54] MULTICHANNEL RADAR SYSTEM FOR MOTOR VEHICLES

[75] Inventors: Takurou Koyanagi; Hiroyuki Andou; Takaaki Nagai, all of Saitama-ken, Japan

[73] Assignee: Honda Giken Kogyo Kabushiki Kaisha, Tokyo, Japan

[21] Appl. No.: 555,800

[22] Filed: Nov. 9, 1995

[30]  Foreign Application Priority Data

Nov. 10, 1994 [JP] Japan .................................. 6-301428

[51] Int. Cl.⁶ ...................................................... G01S 13/93
[52] U.S. Cl. ................................ 342/70; 342/82; 342/85; 342/86
[58] Field of Search ........................... 342/70, 71, 72, 342/82, 85, 86, 127, 73

[56]  References Cited

U.S. PATENT DOCUMENTS

| | | | |
|---|---|---|---|
| 3,680,092 | 7/1972 | Scott | 342/85 |
| 4,101,888 | 7/1978 | Heller et al. | 342/111 |
| 5,181,037 | 1/1993 | Komatsu | 342/70 |
| 5,229,774 | 7/1993 | Satoru | 342/70 |
| 5,302,956 | 4/1994 | Asbury et al. | 342/70 |
| 5,325,096 | 6/1994 | Pakett | 342/70 |
| 5,369,409 | 11/1994 | Urabe et al. | 342/133 |
| 5,493,302 | 2/1996 | Woll et al. | 342/71 |
| 5,512,901 | 4/1996 | Chen et al. | 342/175 |
| 5,530,447 | 6/1996 | Henderson et al. | 342/70 |

FOREIGN PATENT DOCUMENTS

0568427A1  11/1993  European Pat. Off. .

*Primary Examiner*—John B. Sotomayor
*Attorney, Agent, or Firm*—Lyon & Lyon

[57]  ABSTRACT

A multichannel radar system for use on a motor vehicle has a plurality of transmission and reception channels each composed of an AM or FM signal generator for generating an AM or FM signal including a carrier which is amplitude- or frequency-modulated by a modulation signal, transmission and reception antennas for radiating the generated AM signal and receiving a return signal reflected by an obstacle, an amplifier for amplifying the received return signal, and either a detector for detecting the amplified return signal or a mixer for mixing the amplified return signal with the FM signal generated by the FM signal generator thereby to generate a beat signal. A power supply circuit supplies DC voltages respectively to the AM or FM signal generators and the amplifiers of the respective transmission and reception channels in a time-division multiplex manner at successive times. A processor calculates a distance up to the obstacle based on either the phase difference between the detected return signals and the modulation signals or the frequencies of the beat signals in the respective transmission and reception channels.

10 Claims, 4 Drawing Sheets

MULTICHANNEL RADAR SYSTEM FOR MOTOR VEHICLES

BACKGROUND OF THE INVENTION

1. Field of the Invention

The present invention relates to a multichannel radar system for use on motor vehicles such as automobiles.

2. Description of the Prior Art:

Radar systems mounted on motor vehicles such as automobiles are used in combination with alarm and/or indicator devices for helping to prevent collisions between motor vehicles and also between motor vehicles and other objects. Such radar systems on motor vehicles are required to detect small ranges of about several tens centimeters because they should be used to give warnings against collisions between motor vehicles in small ranges such as upon traffic jams and also against collisions between motor vehicles and objects such as when they are parked in garages. In view of such a requirement, AM and FM radar systems are preferable to pulse radar systems for use on motor vehicles. The carrier in such AM and FM radar systems should preferably be in a millimeter wave range, particularly in the vicinity of 60 GHz which is noted for its high absorption by oxygen, in order to achieve smaller radar module sizes and avoid interference with existing microwave communications systems.

FM radar systems which employ millimeter waves are disclosed in U.S. Pat. Nos. 5,181,037, 5,229,774, and 5,369,409, for example.

Radar systems installed on motor vehicles should radiate a number of beam signals for detecting obstacles or targets which may possibly be located in a relatively wide space in front and laterally of the motor vehicle. To meet such a requirement, the radar systems on motor vehicles have a number of transmission and reception channels for transmitting beam signals and receiving reflected signals. The radar systems on motor vehicles also have large power requirements because they employ low-efficiency ultra-high-frequency electronic devices including oscillators and modulators that operate in a millimeter wave range. The conventional radar systems disclosed in the above U.S. patents have a single signal generator that operates all the time which produces an output signal to be distributed among transmission channels through an intermittently operated switching device or amplifier. Such a single signal generator consumes a relatively large amount of electric power. It is important that the radar systems on motor vehicles have reduced power requirements as all the DC electric power needed to operate the radar systems has to be generated on the motor vehicles Lower power consumption by radar systems is more important on electric vehicles which will be expected to find more use in the future.

In the event of a failure of the radar system on a motor vehicle, if the driver of the motor vehicle is unaware of the malfunction of the radar system, then the motor vehicle will be in a dangerous situation because the driver drives the motor vehicle relying upon the detecting and alarming capabilities of the radar system. Inasmuch as the conventional radar systems have a single signal generator, if the single signal generator becomes defective, then all the transmission channels fail to operate.

The radar systems installed on motor vehicles normally operate on the time-sharing principles in that beam signals are time-division-multiplexed for radiation from a plurality of respective antennas. For reducing the power requirements of the time-sharing radar systems, DC voltages supplied to signal generators and amplifiers thereof are periodically turned on and off. However, when the DC voltages supplied to the signal generators and amplifiers are periodically turned on and off frequently, their electric characteristics tend to be unstable, lowering the detecting accuracy of the radar systems.

SUMMARY OF THE INVENTION

It is an object of the present invention to provide a multichannel radar system for use on motor vehicles which has relatively low power requirements.

Another object of the present invention is to provide a multichannel radar system for use on motor vehicles which is highly reliable in that some of its functions can survive in the event of a failure of part of the radar system.

Still another object of the present invention is to provide a multichannel radar system for use on motor vehicles which is capable of detecting obstacles or targets with high accuracy while DC voltages supplied to signal generators and amplifiers are being periodically turned on and off.

According to the present invention, there is provided a multichannel AM radar system for use on a motor vehicle, comprising a plurality of transmission and reception channels each composed of an AM signal generator for generating an AM signal including a carrier which is amplitude-modulated by a modulation signal, an antenna for radiating the generated AM signal and receiving a return signal reflected by an obstacle, an amplifier for amplifying the received return signal, and a detector for detecting the amplified return signal, a power supply for supplying DC voltages respectively to the AM signal generators and the amplifiers of the respective transmission and reception channels in a time-division multiplex manner at successive times, and a range calculator for calculating a distance up to the obstacle based on the phase difference between the detected return signals and the modulation signals in the respective transmission and reception channels.

The range calculator may comprise a circuit for calculating the distance based on the phase difference which is detected only at an end of periods over which the DC voltages are supplied to said AM signal generators by said power supply. The multichannel radar system may further comprise a modulation signal generator for supplying the modulation signals to the AM signal generators in the respective transmission and reception channels only at an end of periods over which the DC voltages are supplied to said AM signal generators by said power supply. The power supply may comprise a circuit for warming up the AM signal generators and the amplifiers of the respective transmission and reception channels with the supplied DC voltages before the distance up to the obstacle is calculated by said range calculator.

According to the present invention, there is also provided a multichannel FM radar system for use on a motor vehicle, comprising a plurality of transmission and reception channels each composed of an FM signal generator for generating an FM signal including a carrier which is frequency-modulated by a modulation signal, an antenna for radiating the generated FM signal and receiving a return signal reflected by an obstacle, an amplifier for amplifying the received return signal, and a mixer for mixing the amplified return signal with the FM signal generated by said FM signal generator thereby to generate a beat signal, a power supply for supplying DC voltages respectively to the FM signal generators and the amplifiers of the respective transmission and reception channels in a time-division multiplex manner at successive times, and a range calculator for calculating a distance up to the obstacle based on the frequencies of the beat signals in the respective transmission and reception channels.

The range calculator may comprise a circuit for calculating the distance based on the frequency which is detected only at an end of periods over which the DC voltages are supplied to said FM signal generators by said power supply. The multichannel radar system may farther comprise a modulation signal generator for supplying the modulation signals to the FM signal generators in the respective transmission and reception channels only at an end of periods over which the DC voltages are supplied to said FM signal generators by said power supply. The power supply may comprise a circuit for warming up the FM signal generators and the amplifiers of the respective transmission and reception channels with the supplied DC voltages before the distance up to the obstacle is calculated by said range calculating.

According to the present invention, there is farther provided a multichannel radar system for use on a motor vehicle, comprising a plurality of transmission and reception channels each composed of a signal generator for generating a signal including a carrier which is modulated by a modulation signal, an antenna for radiating the generated signal and receiving a return signal reflected by an obstacle, an amplifier for amplifying the received return signal, and a detector for detecting the amplified return signal, a power supply for supplying DC voltages respectively to the signal generators and the amplifiers of the respective transmission and reception channels in a time-division multiplex manner at successive times, and a processor for processing the detected return signals and the modulation signals in the respective transmission and reception channels to determine a distance up to the obstacle.

The power supply may comprise a circuit for warming up the signal generators and the amplifiers of the respective transmission and reception channels with the supplied DC voltages before the distance up to the obstacle is determined by said processor.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
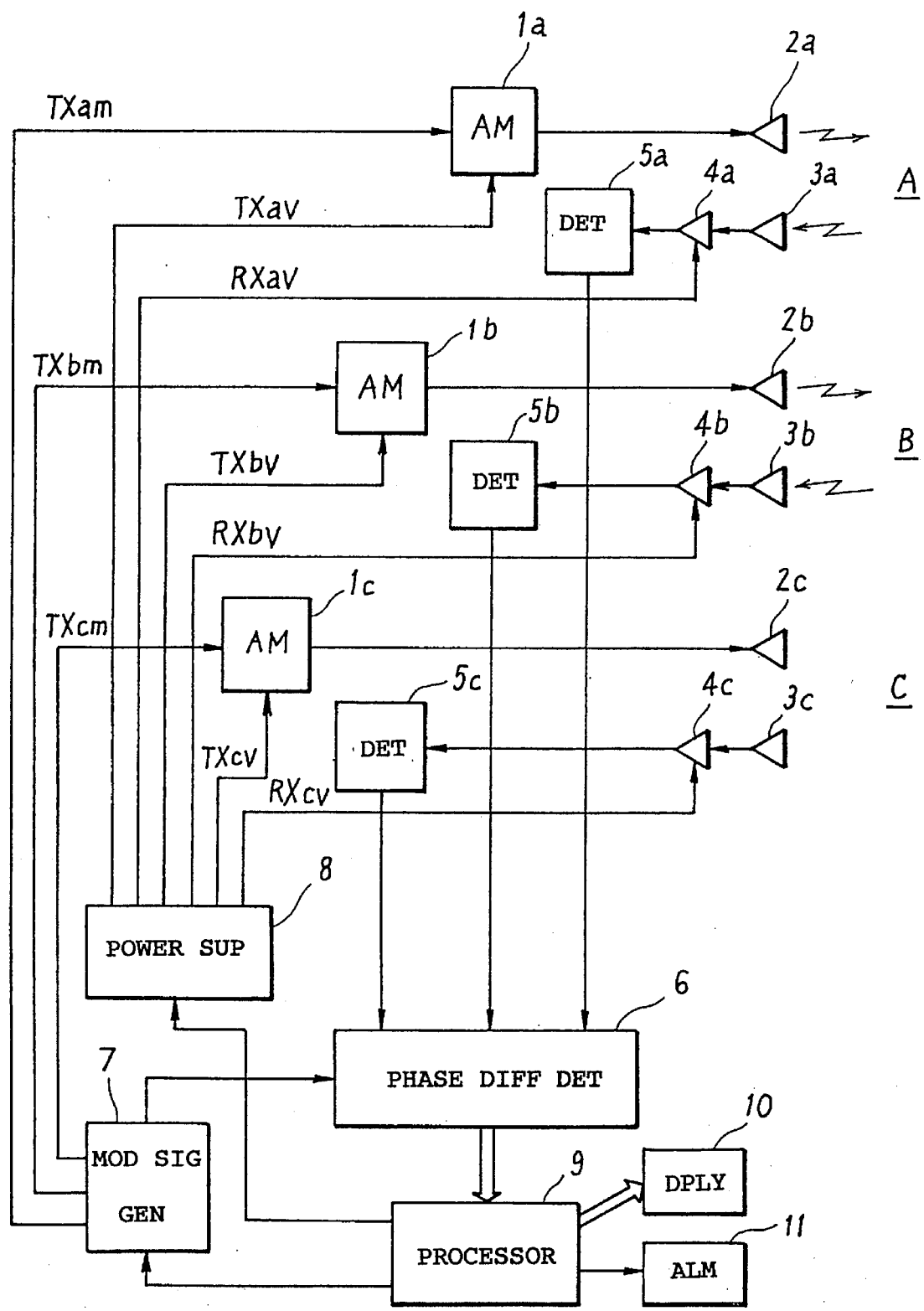
FIG. 1 is a block diagram of a multichannel AM radar system for use on a motor vehicle according to an embodiment of the present invention.

As shown in FIG. 1, a multichannel AM radar system for use on a motor vehicle according to an embodiment of the present invention generally comprises three transmission and reception channels A, B, C, a phase difference detector 6, a modulation signal generator 7, a power supply circuit 8, a processor 9, a display circuit 10, and an alarm circuit 11 which are all common to the three transmission and reception channels A, B, C. While the multichannel AM radar system is shown as having the three transmission and reception channels A, B, C for illustrative purpose, it actually preferably has at least ten transmission and reception channels for covering the entire space around the motor vehicle.

The transmission and reception channel A comprises an AM signal generator 1 a connected to the modulation signal generator 7 and the power supply circuit 8, a transmission antenna 2a connected to the AM signal generator 1a, a reception antenna 3a, an amplifier 4a connected to the reception antenna 3a and the power supply 8, and a detector 5a connected to the amplifier 4a and the phase difference detector 6. The transmission and reception channel B comprises an AM signal generator 1b connected to the modulation signal generator 7 and the power supply circuit 8, a transmission antenna 2b connected to theAM signal generator 1b , a reception antenna 3b, an amplifier 4b connected to the reception antenna 3b and the power supply 8, and a detector 5b connected to the amplifier 4b and the phase difference detector 6. The transmission and reception channel C comprises an AM signal generator 1c connected to the modulation signal generator 7 and the power supply circuit 8, a transmission antenna 2c connected to the AM signal generator 1c , a reception antenna 3c, an amplifier 4c connected to the reception antenna 3c and the power supply 8, and a detector 5c connected to the amplifier 4c and the phase difference detector 6.

Figure 2:
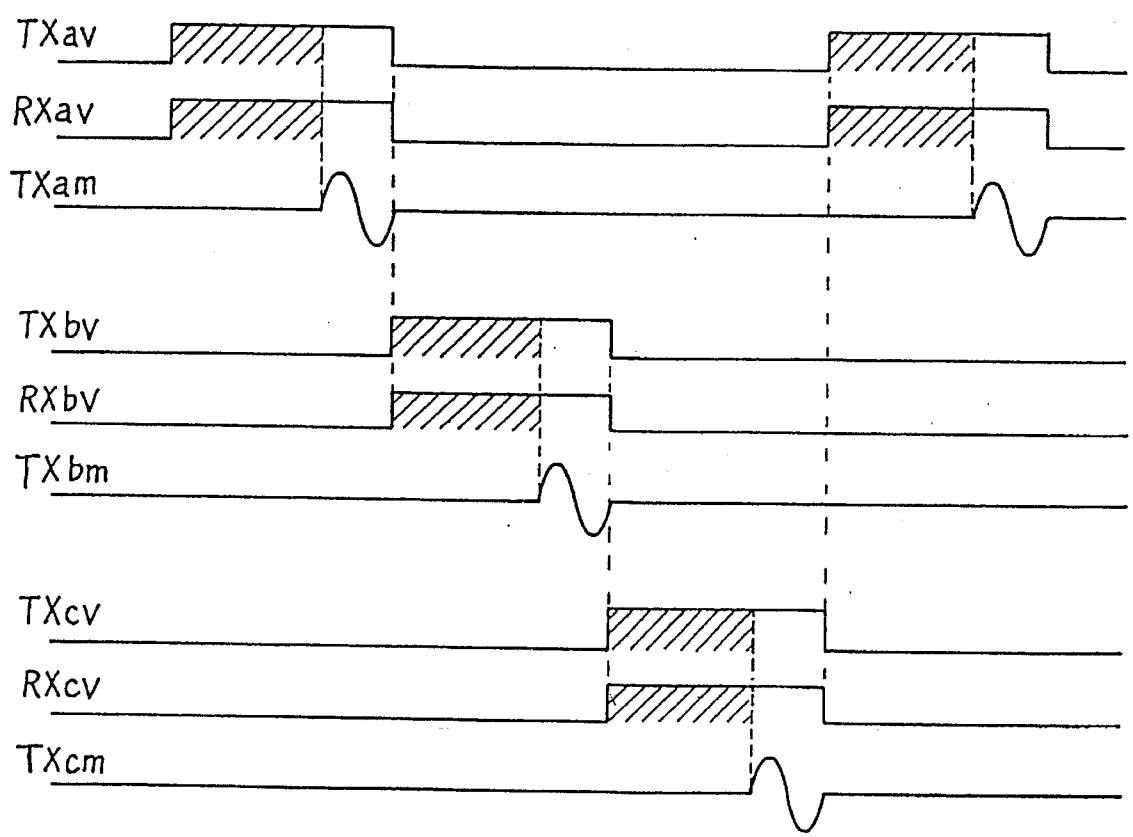
FIG. 2 is a timing chart showing an operation sequence of the multichannel AM radar system shown in FIG. 1.

As shown in FIG. 2, the power supply circuit 8 supplies power supply voltages TXav, TXbv, TXcv respectively to the AM signal generators 1a, 1b , 1c at successive times in a time-division multiplex manner. At the same successive times as the power supply voltages TXav, TXbv, TXcv, the power supply circuit 8 supplies power supply voltages RXav, RXbv, RXcv respectively to the amplifiers 4a , 4b , 3c in a time-division multiplex manner. The modulation signal generator 7 supplies sine-wave modulation signals TXam, TXbm, TXcm, each one wavelength long, respectively to the AM signal generators ta, 1b , 1c at successive times in a time-division multiplex manner.

Each of the AM signal generators 1a, 1b , 1c may comprise a millimeter-wave oscillator composed of FETs or HEMTs, for example, and a modulator composed of Schottky barrier diodes connected to the output terminals of the millimeter-wave oscillator. The oscillation of the millimeter-wave oscillators is turned on and off when the power supply voltages TXav, TXbv, TXcv are turned on and off, and the signal level of millimeter-wave signals is varied in a sine-wave pattern according to the amplitude of the sine-wave modulation signals TXam, TXbm, TXcm supplied to the modulators.

In the transmission and reception channel A, the AM signal generator 1a and the amplifier 4a are warmed up in respective periods (shown hatched in FIG. 2) over which the power supply voltages TXav, TXbv are supplied. When the AM signal generator 1a and the amplifier 4a are stabilized after their warming-up, theAM signal generator 1a is supplied with the modulation signal TXam, and generates an AM signal which is radiated from the transmission antenna 2a. A return signal reflected by an obstacle or target outside of the motor vehicle is received by the reception antenna 3a, and supplied through the amplifier 4a to the detector 5a, which supplies a detected signal to the phase difference detector 6.

The difference detector 6 is also supplied with the modulation signal generated by the modulation signal generator 7. Therefore, the difference detector 6 detects the phase difference between the supplied modulation signal and the detected signal from the detector 5a. The detected phase difference contains information representing a period of time required for the AM signal generated by the AM signal generator 1a to travel from the transmission antenna 2a to the obstacle and then return from the obstacle back to the reception antenna 3a, i.e., information representing the distance or range between the AM radar system and the obstacle. The processor 9 calculates the distance from the AM radar system to the obstacle based on the phase difference which is detected by the phase difference detector 6.

When the detection by the processor 9 of the distance up to the obstacle with respect to the transmission channel A is finished, a distance up to the obstacle is similarly detected by the processor 9 with respect to the transmission channel B which similarly operates intermittently on the supplied power supply voltage. When the detection by the processor 9 of the distance up to the obstacle with respect to the transmission channel B is finished, a distance up to the obstacle is similarly detected by the processor 9 with respect to the transmission channel C which similarly operates intermittently on the supplied power supply voltage. When the detection by the distance up to the obstacle with respect to the transmission channel C is finished, a distance up to the obstacle is detected again by the processor 9 with respect to the transmission channel A which similarly operates intermittently on the supplied power supply voltage. Since the AM signal generator and the amplifier in each of the transmission channels A, B, C are warmed up in the respective periods after the power supply voltages start being applied until their electric characteristics are stabilized, and no phase difference is detected in these warm-up periods, the multichannel AM radar system can detect the distance up to the obstacle with high accuracy.

The AM signal generators 1a, 1b, 1c are included in the respective transmission channels A, B, C and intermittently operated at successive times by the intermittently supplied power supply voltages. Therefore, the power requirement of the radar system is smaller than that of conventional radar systems which have a single signal generator that operates all the time which produces an output signal to be distributed among transmission channels through an intermittently operated switching device or amplifier.

Furthermore, even when any of the AM signal generators 1a, 1b, 1c included in the respective transmission channels A, B, C fails, since the other AM signal generators and the corresponding transmission channels remain normal, the multichannel AM radar system is still operational to detect an obstacle around the motor vehicle though its detecting capability is somewhat lowered.

In the multichannel AM radar system shown in FIG. 1, rectangular-wave modulation signals, rather than sine-wave modulation signals, may be supplied from the modulation signal generator 7 to the AM signal generators 1a, 1b, 1c.

Figure 3:
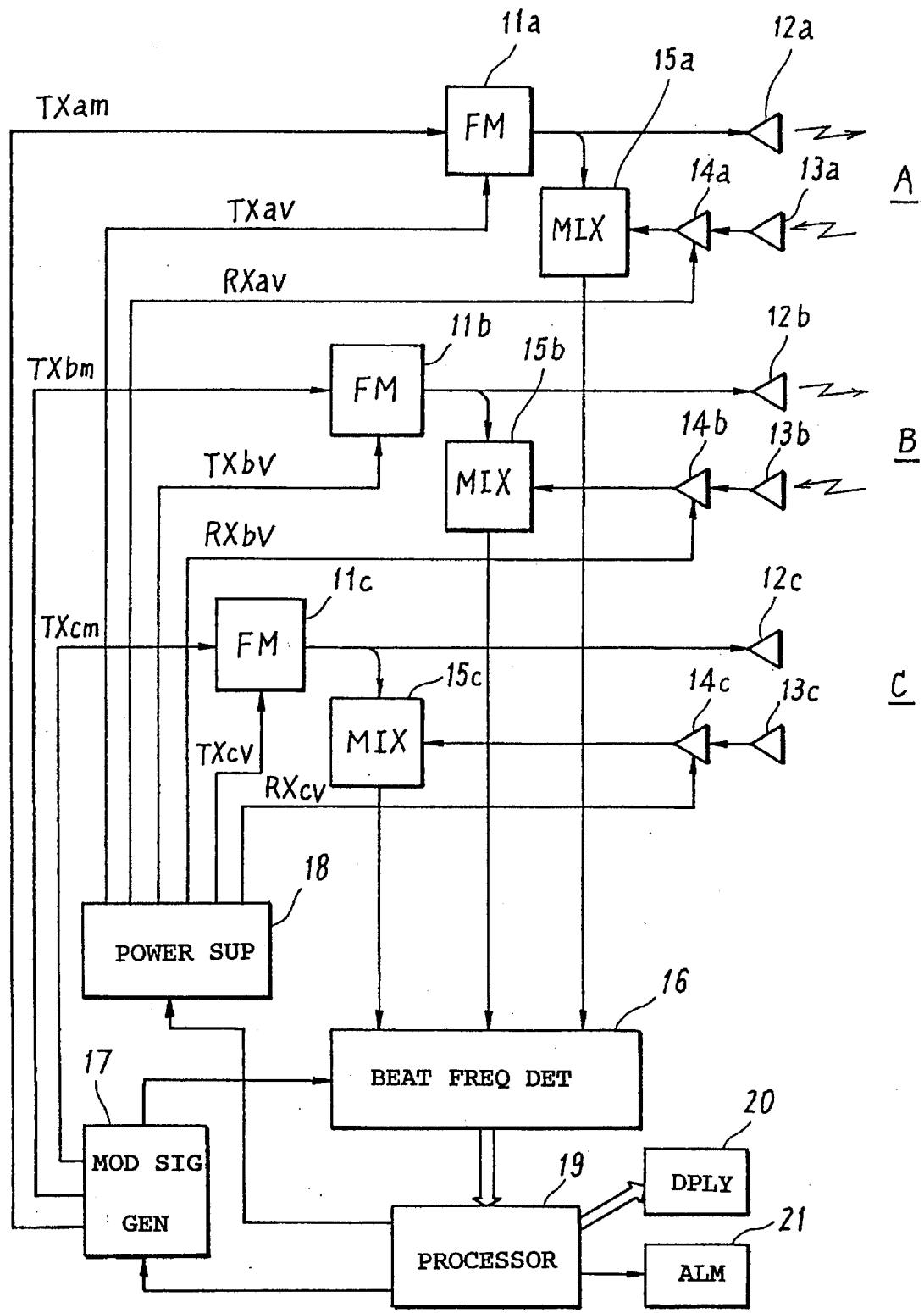
FIG. 3 is a block diagram of a multichannel FM radar system for use on a motor vehicle according to another embodiment of the present invention.

FIG. 3 shows a multichannel FM radar system for use on a motor vehicle according to another embodiment of the present invention. The multichannel FM radar system generally comprises three transmission and reception channels A, B, C, a beat frequency detector 16, a modulation signal generator 17, a power supply circuit 18, a processor 19, a display circuit 20, and an alarm circuit 21 which are all common to the three transmission and reception channels A, B, C. While the multichannel FM radar system is shown as having the three transmission and reception channels A, B, C for illustrative purpose, it actually preferably has at least ten transmission and reception channels for covering the entire space around the motor vehicle.

The transmission and reception channel A comprises an FM signal generator 11a connected to the modulation signal generator 17 and the power supply circuit 18, a transmission antenna 12a connected to the FM signal generator 11a, a reception antenna 13a, an amplifier 14a connected to She reception antenna 13a and the power supply 18, and a mixer 15a connected to the FM signal generator 11a, the amplifier 14a, and the beat frequency detector 16. The transmission and reception channel B comprises an FM signal generator 11b connected to the modulation signal generator 17 and the power supply circuit 18, a transmission antenna 12b connected to the FM signal generator 11b, a reception antenna 13b, an amplifier 14b connected to the reception antenna 13b and the power supply 18, and a mixer 15b connected to the FM signal generator 11b, the amplifier 14b, and the beat frequency detector 16. The transmission and reception channel C comprises an FM signal generator 11c connected to the modulation signal generator 17 and the power supply circuit 18, a transmission antenna 12c connected to the FM signal generator 11c, a reception antenna 13c, an amplifier 14c connected to the reception antenna 13c and the power supply 18, and a mixer 15c connected to the FM signal generator 11c, the amplifier 14c, and the beat frequency detector 16.

Figure 4:
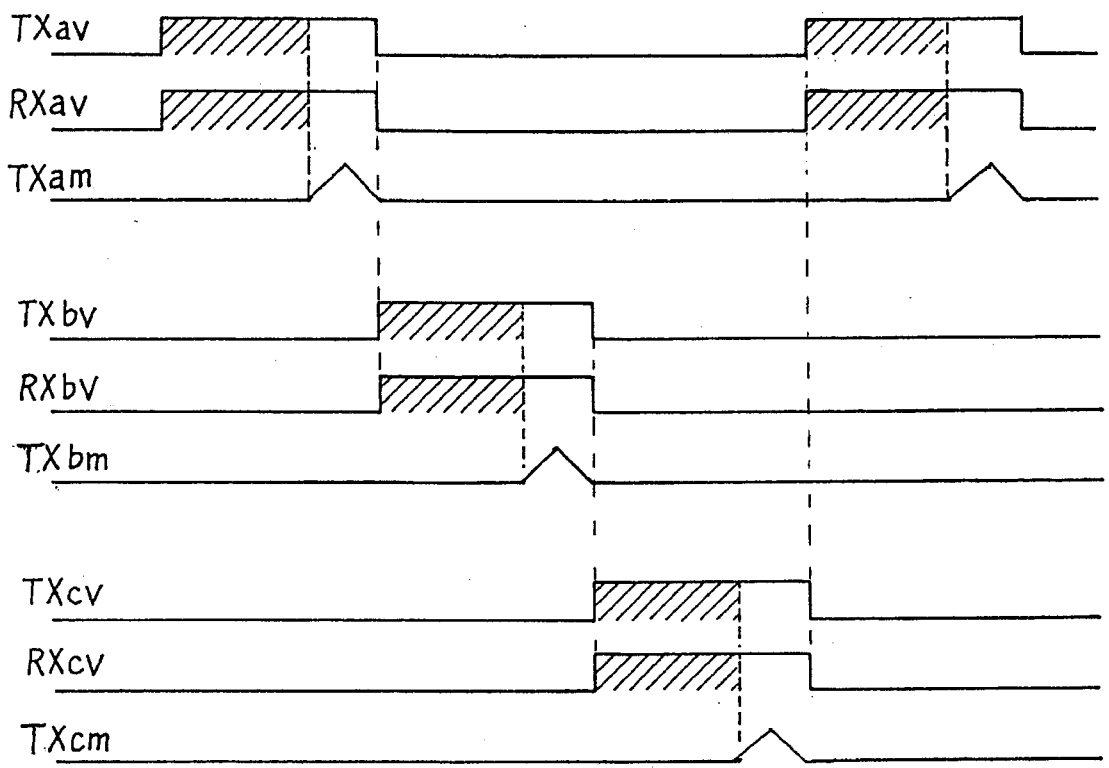
FIG. 4 is a timing chart showing an operation sequence of the multichannel FM radar system shown in FIG. 3.

As shown in FIG. 4, the power supply circuit 18 supplies power supply voltages TXav, TXbv, TXcv respectively to the FM signal generators 11a, 11b, 11c at successive times in a time-division multiplex manner. At the same successive times as the power supply voltages TXav, TXbv, TXcv, the power supply circuit 18 supplies power supply voltages Rxav, RXbv, RXcv respectively to the amplifiers 14a, 14b, 14c in a time-division multiplex manner. The modulation signal generator 17 supplies triangular-wave modulation signals TXam, TXbm, TXcm respectively to the FM signal generators 11a, 11b, 11c at successive times in a time-division multiplex manner.

Each of the FM signal generators 11a, 11b, 11c may comprise a voltage-controlled oscillator (VCO) composed of gunn diodes or HEMTs, for example. The oscillation of the VCOs is turned on and off when the power supply voltages TXav, TXbv, TXcv are turned on and off, and the signal level of millimeter-wave signals is varied in a triangular-wave pattern according to the amplitude of the triangular-wave modulation signals TXam, TXbm, TXcm supplied to the bias terminals of the VCOs.

In the transmission and reception channel A, the FM signal generator 11a and the amplifier 14a are warmed up in respective periods (shown hatched in FIG. 4) over which the power supply voltages TXav, TXbv are supplied. When the FM signal generator 11a and the amplifier 14a are stabilized after their warming-up, the FM signal generator 11a is supplied with the modulation signal TXam, and generates an FM signal which is radiated from the transmission antenna 12a. A return signal reflected by an obstacle or target outside of the motor vehicle is received by the reception antenna 13a, and supplied through the amplifier 14a to the mixer 15a, which supplies a generated beat signal to the beat frequency detector 16.

The beat frequency detector 16, which may comprise a fast Fourier transformation (FFT) circuit, detects a beat frequency by generating a frequency spectrum of the beat signal. The detected beat frequency contains information representing a period of time required for the FM signal generated by the FM signal generator 11a to travel from the transmission antenna 12a to the obstacle and then return from the obstacle back to the reception antenna 13a, i.e., information representing the distance or range between the FM radar system and the obstacle. The processor 19 calculates the distance from the FM radar system to the obstacle based on the beat frequency which is detected by the beat frequency detector 16.

When the detection by the processor 19 of the distance up to the obstacle with respect to the transmission channel A is finished, a distance up to the obstacle is similarly detected by the processor 19 with respect to the transmission channel B which similarly operates intermittently on the supplied power supply voltage. When the detection by the processor 19 of the distance up to the obstacle with respect to the transmission channel B is finished, a distance up to the obstacle is similarly detected by the processor 19 with respect to the transmission channel C which similarly operates intermittently on the supplied power supply voltage. When the detection by the processor 19 of the distance up to the obstacle with respect to the transmission channel C is finished, a distance up to the obstacle is detected again by the processor 19 with respect to the transmission channel A which similarly operates intermittently on the supplied power supply voltage.

Since the FM signal generator and the amplifier in each of the transmission channels A, B, C are warmed up in the respective periods after the power supply voltages start being applied until their electric characteristics are stabilized, and no beat frequency is detected in these warm-up periods, the multichannel FM radar system can detect the distance up to the obstacle with high accuracy.

The multichannel FM radar system shown in FIG. 3 also offers the same advantages, described above, as those of the multichannel AM radar system shown in FIG. 1.

In each of the above embodiments, separate transmission and reception antennas are included in each of the transmission and reception channels A, B, C. However, each of the transmission and reception channels A, B, C may instead have a single antenna capable of both transmitting and receiving signals, in combination with a transmission and reception signal separating circuit which comprises a circulator.

In the above embodiments, modulation signals are supplied to the AM or FM signal generators at the end of the warm-up periods. According to a modification, however, modulation signals may be supplied at all times to the AM or FM signal generators, and the phase difference of detected signals or the frequency of beat signals, generated from return signals reflected by the obstacle, may be detected only at the end of periods over which the power supply voltages are supplied to the AM or FM signal generators.

Although certain preferred embodiments of the present invention have been shown and described in detail, it should be understood that various changes and modifications may be made therein without departing from the scope of the appended claims.

What is claimed is:

1. A multichannel radar system for use on a motor vehicle, comprising:

a plurality of transmission and reception channels each composed of an AM signal generator for generating an AM signal including a carrier which is amplitude-modulated by a modulation signal, an antenna for radiating the generated AM signal and receiving a return signal reflected by an obstacle, an amplifier for amplifying the received return signal, and a detector for detecting the amplified return signal;

a power supply for supplying DC voltages respectively to the AM signal generators and the amplifiers of the respective transmission and reception channels in a time-division multiplex manner at successive times; and a range calculator for calculating a distance up to the obstacle based on the phase difference between the detected return signals and the modulation signals in the respective transmission and reception channels.

2. A multichannel radar system according to claim 1, wherein said range calculator for caluculating the distance based on the phase difference which is detected only at an end of periods over which the DC voltages are supplied to said AM signal generators by said power supply.

3. A multichannel radar system according to claim 1, farther comprising a modulation signal generator for supplying the modulation signals to the AM signal generators in the respective transmission and reception channels only at an end of periods over which the DC voltages are supplied to said AM signal generators by said power supply.

4. A multichannel radar system according to claim 1, wherein said power supply warms up the AM signal generators and the amplifiers of the respective transmission and reception channels with the supplied DC voltages before the distance up to the obstacle is calculated by said range calculator.

5. A multichannel radar system for use on a motor vehicle, comprising:

a plurality of transmission and reception channels each composed of an FM signal generator for generating an FM signal including a carrier which is frequency-modulated by a modulation signal, an antenna for radiating the generated FM signal and receiving a return signal reflected by an obstacle, an amplifier for amplifying the received return signal, and a mixer for mixing the amplified return signal with the FM signal generated by said FM signal generator thereby to generate a beat signal;

a power supply for supplying DC voltages respectively to the FM signal generators and the amplifiers of the respective transmission and reception channels in a time-division multiplex manner at successive times; and a range calculator for culculating a distance up to the obstacle based on the frequencies of the beat signals in the respective transmission and reception channels.

6. A multichannel radar system according to claim 5, wherein said range calculator calculates the distance based on the frequency which is detected only at an end period over which the DC voltages are supplied to said FM signal generators by said power supply.

7. A multichannel radar system according to claim 5 further comprising a modulation signal generator for supplying the modulation signals to the FM signal generators in the respective transmission and reception channels only at an end of periods over which the DC voltages are supplied to said FM signal generators by said power supply.

8. A multichannel radar system according to claim 5, wherein said power supply warms up the FM signal generators and the amplifiers of the respective transmission and reception channels with the supplied DC voltages before the distance up to the obstacle is calculated by said range calculator.

9. A multichannel radar system for use on a motor vehicle, comprising:

a plurality of transmission and reception channels each composed of a signal generator for generating a signal including a carrier which is modulated by a modulation signal, an antenna for radiating the generated signal and receiving a return signal reflected by an obstacle, an amplifier for amplifying the received return signal, and a detector for detecting the amplified return signal;

a power supply for supplying DC voltages respectively to the signal generators and the amplifiers of the respective transmission and reception channels in a time-division multiplex manner at successive times; and a processor for processing the detected return signals and the modulation signals in the respective transmission and reception channels to determine a distance up to the obstacle.

10. A multichannel radar system according to claim 9, wherein said power supply means warms up the signal generators and the amplifiers of the respective transmission and reception channels with the supplied DC voltages before the distance up to the obstacle is determined by said processor.

* * * * *